United States Patent
Davis et al.

[11] 3,734,573
[45] May 22, 1973

[54] ADAPTIVE CONTROL FOR FLUID PRESSURE BRAKING SYSTEMS

[75] Inventors: Dennis J. Davis; Sham L. Kurichh; Gilbert A. Pataky, all of Elyria, Ohio

[73] Assignee: Bendix-Westinghouse Automotive Air Brake Company, Elyria, Ohio

[22] Filed: Oct. 16, 1970

[21] Appl. No.: 81,481

[52] U.S. Cl. ............ 303/21 F, 303/20, 303/21 BE, 303/21 AF, 303/40, 303/68
[51] Int. Cl. ............................................. B60t 8/12
[58] Field of Search ............... 188/181; 303/6, 10, 303/21, 40, 58, 61-63, 68-69

[56] References Cited

UNITED STATES PATENTS

| | | | |
|---|---|---|---|
| 3,497,269 | 2/1970 | Van Wicklin, Jr. | 303/21 F |
| 3,536,362 | 10/1970 | Davis | 303/21 F |
| 3,544,171 | 12/1970 | Lester et al. | 303/61 X |
| 3,124,220 | 3/1964 | Kell | 303/21 F X |
| 3,574,416 | 4/1971 | Skoyles | 303/61 X |
| 3,545,817 | 12/1970 | Yarber | 303/21 P |
| 3,608,984 | 9/1971 | Skoyles | 303/21 F |
| 3,623,778 | 11/1971 | Horvath | 303/21 F |

FOREIGN PATENTS OR APPLICATIONS

| | | | |
|---|---|---|---|
| 1,964,819 | 7/1970 | Germany | 303/21 F |

*Primary Examiner*—Milton Buchler
*Assistant Examiner*—Stephen G. Kunin
*Attorney*—Scrivener, Parker, Scrivener & Clarke

[57] ABSTRACT

Adaptive control for a fluid pressure braking system of the type which when a wheel decelerates to an impending skid opens an exhaust valve to reduce pressure in the actuator and after the wheel has accelerated in response thereto closes the exhaust valve and restores pressure in the actuator, the invention including apparatus responsive to the fluid pressure in the actuator at the time the exhaust valve is opened for controlling the rate of fluid flow from the actuator through the exhaust port, the rate of fluid flow being preferably controlled by apparatus for varying the effective exhaust area in the path of fluid flow from the actuator in response to pressure in the actuator whereby for high actuator pressure a small exhaust area is provided and for a low actuator pressure a large exhaust area is provided.

14 Claims, 5 Drawing Figures

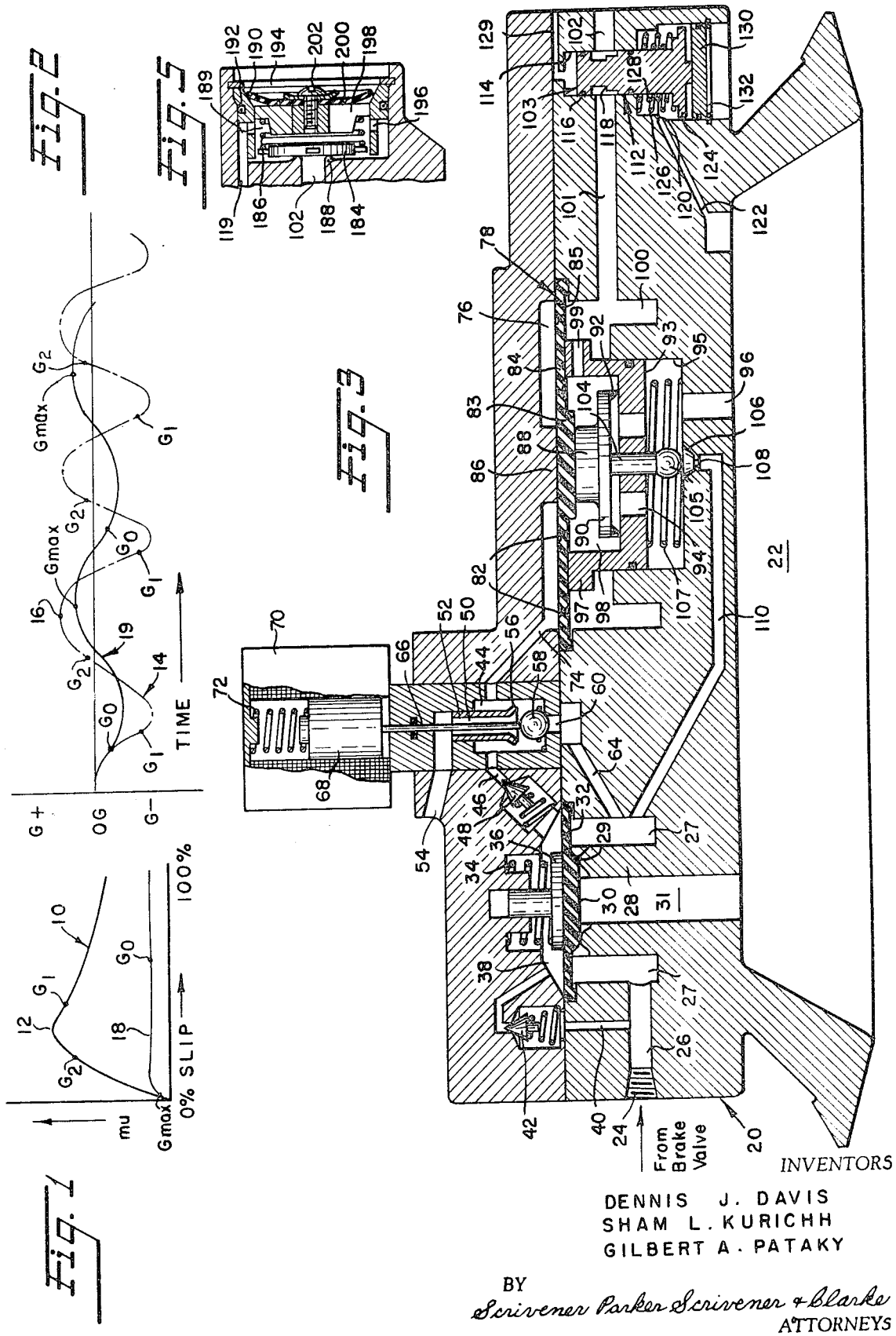

ADAPTIVE CONTROL FOR FLUID PRESSURE BRAKING SYSTEMS

DESCRIPTION OF THE INVENTION

This invention relates to fluid pressure braking systems and more particularly to adaptive, anti-wheel lock control for fluid pressure braking systems.

Adaptive anti-lock braking systems have become well-known in the art and such systems usually operate on the principal of opening an independent exhaust valve to relieve pressure from an actuator when the rate of wheel deceleration indicates an impending skid and after the wheel has recovered to a predetermined rate of acceleration, the exhaust is closed and pressure is restored to the actuator until a skid again impends whereupon the cycle is repeated.

When such systems rely merely on the opening of an exhaust orifice of a fixed cross-sectional area it will be quite apparent that with a high pressure in the actuator (indicative of good road conditions), when a skid impends the rate of exhaust through the fixed orifice will be higher than it would be where a skid impends with only relatively low pressure in the actuator (indicative of bad or slippery road conditions). To insure proper reduction of pressure with low pressure in the actuator, the orifice should be of a relatively large size, but this would permit too much pressure to escape from the actuator during high pressure conditions before the wheel has had sufficient time to accelerate to the level at which the exhaust valve is closed and actuator pressure is restored.

The foregoing is a recognized problem and adjustable exhaust valve means have been provided but such systems have usually relied on complex wheel acceleration sensing means requiring highly complex and costly electronic components and requiring the use of considerable power for proper operation.

The broad object of the present invention is to provide for an adaptive brake control system a variable area exhaust which does not rely on any electronics whatever to establish the exhaust area.

More particularly, it is an object of the invention to establish exhaust area and consequent rate of exhaust as a function of the actual pressure existing in the brake chamber at the time skidding impends; that is, when pressure is low at the pending skid point due to bad or slippery road conditions, the exhaust orifice area is increased in response to the low pressure in the actuator whereas when the pressure is high the orifice area is decreased.

Yet another object of the invention is to provide a system of the foregoing nature wherein the area adjusting means is optimally constructed and arranged to provide a substantially constant mass rate of exhaust for any pressure existing in the actuator.

Still another object of the invention is to provide improved valve operating means for effecting reduction and restoration of pressure in the actuator in response to wheel generating signals indicative of skidding conditions.

The invention will now be described in conjunction with the accompanying drawings wherein:

FIG. 1 is a plot of wheel-to-road co-efficient of friction (Mu) against slip;

FIG. 2 is a graphical representation of the cyclical operation of the adaptive system of the invention under two different road-to-wheel conditions;

FIG. 3 is a vertical cross-sectional view of a pressure plate of a fluid pressure brake actuator and a modulating valve constructed in accordance with the invention;

FIG. 5 illustrates a tare check valve which may be utilized with the modulating valve of FIG. 3.

Figure 4:
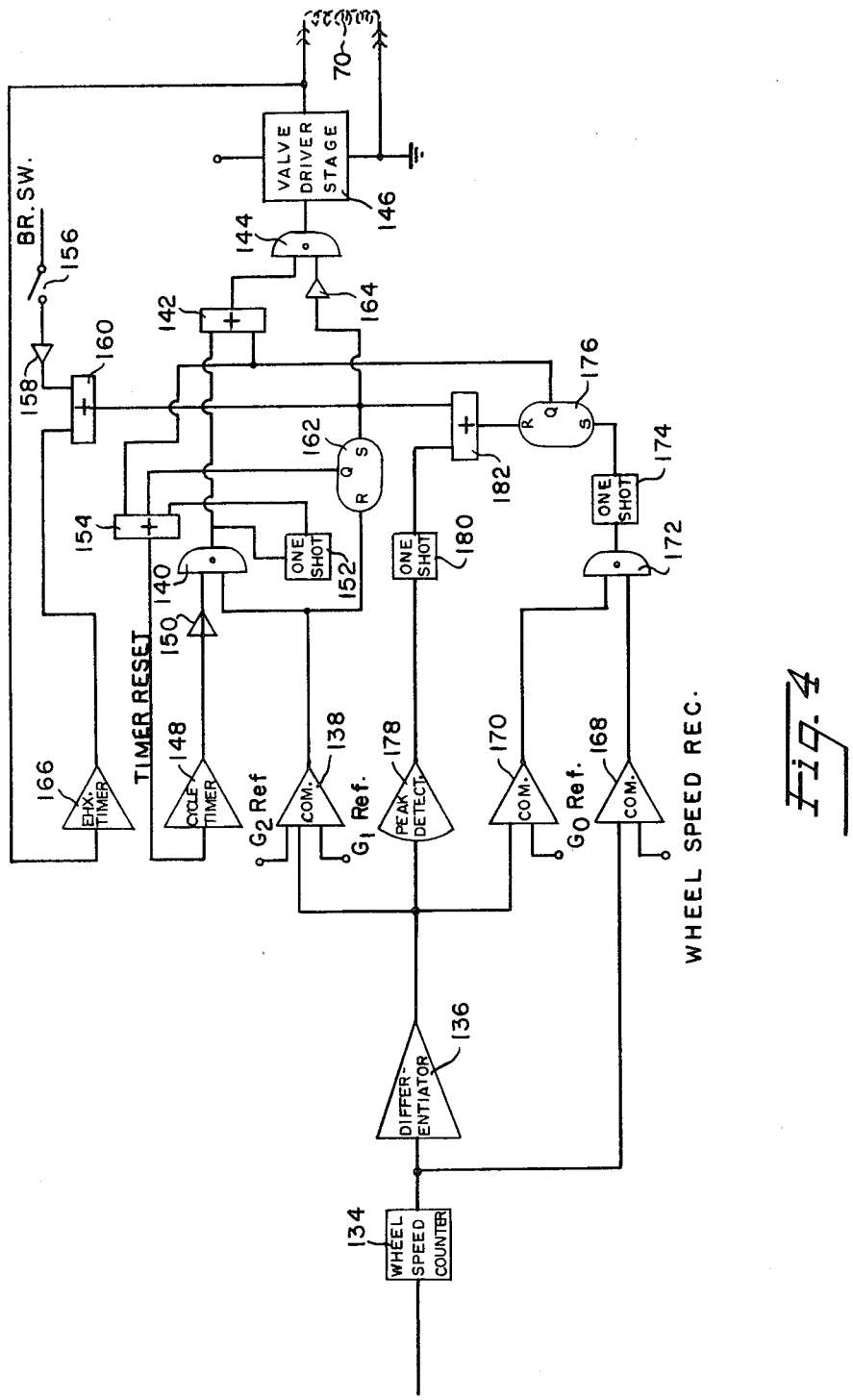
FIG. 4 illustrates logic circuitry for controlling the system of the invention.

Referring now to the drawings, and particularly to FIGS. 1 and 2, the numeral 10 designates a typical Mu-slip curve for average dry road conditions. When there is impending wheel lock up, due a panic stop, for example, on such a road an adaptive braking system relieves and applies braking pressure at the points G1 and G2 respectively, preferably on the opposite sides the peak 12 of the curve. Referring specifically to the phantom line curve 14 of FIG. 2 with a wheel traveling initially at synchronous speed, when the brakes are applied so that a wheel approaches skidding, at a deceleration level G1 the normal adaptive system operates to close an inlet valve and to open an independent exhaust valve to permit the wheel to recover. When the wheel has recovered to a level G2, the exhaust valve is closed and pressure build up recommences at a controlled rate in the brake actuator with the wheel accelerating to some peak level indicated by the numeral 16 at which point the wheel acceleration decreases until the G1 level is again met, whereupon the cycle is repeated until the vehicle is brought to a stop.

Referring back now to FIG. 1, the numeral 18 designates a Mu-slip curve for an extremely slippery road and under these conditions at a deceleration level less than $G_1$, and hereinafter referred to as $G_0$ (see the solid line curve 19 in FIG. 2) the wheel may slow to a lock-up condition without ever passing through a $G_1$ deceleration level and thus the normal adaptive system is ineffective to prevent skidding. As explained in the co-pending application of Davis et al. Ser. No. 76,665, filed Sept. 30, 1970, the foregoing problem is solved by sensing not one but two conditions of the wheel, namely, wheel speed of a predetermined value just short of lock-up and a deceleration rate at a $G_0$ level less than the $G_1$ level, and when these two conditions exist an override system takes control of the system wherein the exhaust valve is opened earlier at the point $G_0$ in FIG. 2 and retained open longer to the point G-max. than would be permitted if the exhaust valve were to close and pressure be restored at the point $G_2$. These features will be further described in connection with the control circuitry employed in the present invention.

Referring now to FIG. 3, the numeral 20 designates a pressure plate of a fluid pressure actuator of the type employing a diaphragm (not shown) which is moved by pressure in the pressure chamber 22 of the actuator against the usual push plate (not shown) to apply the brakes. As can be seen, the pressure plate has a supply port 24 adapted to be connected to the usual manually operated brake control valve, the port 24 leads into a passage 26 terminating in an open topped annular cavity 27 surrounding a boss 28 whose upper side defines a valve seat 29 surrounding a delivery port 30 which is connected by a bore 31 to the pressure chamber 22 of the actuator. Extending over the annular cavity 27 and seat 29 is a diaphragm valve 32 whose central part is urged against the port 30 by a spring 34 and push plate 36 operating in a pressure cavity 38 above the diaphragm valve. When fluid pressure is present in the annular cavity 27 below the valve the central portion thereof is readily pushed clear of the port 30 to admit pressure fluid into the chamber 22 to apply the brakes.

As can be seen, the cavity 38 is connected to the supply passage 26 by way of a vent passage 40 containing a check valve 42 which permits the flow of pressure fluid from the cavity 38 to the supply passage 26 but not in the reverse direction. The pressure cavity 38 is also connected to a control cavity 44 by an inlet passage 46 containing a check valve 48 which permits the flow of pressure fluid from the control cavity 44 to the pressure cavity 38 but not in the reverse direction.

The control cavity 44 is normally connected to atmosphere by way of a passage 50 in a pipe 52 which at its upper end is in open communication with a vent port 54 and carries at its lower end a valve seat 56 controlled by a valve element 58 normally closing a port 60 connected to cavity 27 by way of passage 64. The valve element 58 is rigidly connected to a stem 66 received in the pipe 52 and connected at its upper end to a plunger 68 of a solenoid 70 which is energized and de-energized in response to wheel generated signals, as will be hereinafter described. The plunger 68 is normally urged by a spring 72 to its lower position whereby the valve element 58 is retained in sealing engagement with the port 60.

The control cavity 44 is connected by a passage 74 to a second pressure cavity 76 whose lower wall is defined by a peripherally sealed flexible diaphragm 78 having concentric rings 82 of decreased thickness molded therein and defining a central portion 83 having a degree of mobility independently of an intermediate portion 84 which in turn has a degree of independent mobility with respect to the central portion 83 as well as the peripheral portion 85 of the diaphragm. In the position of the drawing, the upper side of the central portion 83 of the diaphragm engages a fixed abutment 86 and the lower side engages a central abutment 88 on the upper side of a disc like member 90 whose lower side carries an annular lip 92 which normally is in sealing engagement with the upper side of a recessed piston 93 having a series of ports 94 therethrough which provide open communication between the space within the confines of the sealing lip 92 and the lower portion of a recess 95 slidably and sealingly receiving the piston 93. As can be seen, the lower portion of the recess 95 beneath the piston 93 is in open communication with the interior of the pressure space 22 of the actuator by way of a port 96. The annular upper end of the piston 93 has a flange 97 which engages the lower side of the intermediate portion 84 of the diaphragm 78 with the interior of the recessed part of piston 93 being connected by a port 99 to an annular cavity 100 which is connected to atmosphere by way of a passage 101 and an exhaust port 102. Within the passage 101 is a variable restrictor 103 constructed in accordance with the invention and hereinafter described in detail.

Referring back now to the piston 93, slidably received in a central opening therethrough is a stem 104 which is fixed at its upper end to the underside of the disc 90 and carries at its lower end a ball valve 105 which is normally retained off its seat 106 by a spring 107 acting between the lower wall of recess 95 and the underside of piston 93 to urge this upwardly against the lip 92 to raise the disc 90, and the valve 105 to the open position of the drawing whereby a bleed choke 108 controlled by the valve 105 normally communicates the aforementioned annular cavity 27 with the interior of the pressure chamber 22 by way of a passage 110 and port 96. When the disc 90 is raised to its upper position of the drawings due to the action of the spring 107 on the piston 93, the abutment 88 on the other side of the disc 90 and the flange 97 on the upper end of the piston 93 act respectively on the central and intermediate portions 83, 84 of the diaphragm 78 to move it to the position of the drawings.

The operation of the modulator of the invention as so far described is as follows:

In the event the brakes are applied and skidding is not imminent, pressure fluid merely flows from the brake valve through the inlet port and passage 24, 26 to the diaphragm valve 32 which is pushed by the pressure out of engagement with the seat 29 so as to admit pressure fluid to the chamber 22 to apply the brakes in the normal manner. Pressure also flows from the annular cavity 27 through passage 110 and choke 108 into pressure chamber 22.

However, should the wheel decelerate to a level such that skidding is imminent, a signal is generated, say at a deceleration level G1, to energize the solenoid 70 and shift the valve 58 from its normal position of the drawings to its raised position to disconnect the exhaust port 54 from the control cavity 44 while connecting the latter to the delivery pressure from the brake control valve by way of delivery port and passages 24, 26, annular cavity 27, passage 64 and port 60. The pressure fluid thus admitted to cavity 44 unseats check valve 48 and flows into the pressure cavity 38 where it acts in concert with spring 34 to positively move valve 32 against seat 29 to cut off any further communication with the interior of the pressure chamber through the regular supply port 30 so long as the pressure at the inlet port and in the supply passage 26 is equal to or less than the pressure in the cavity 38. Under this condition, the check valve 42 remains closed and pressure is trapped in cavity 38 over valve 32 between the check valves 42, 48 to retain the supply valve 32 closed throughout the entire period of adaptive brake control. Of course, when the operator releases the brake pedal, pressure in cavity 38 flows past check valve 42 and thence to atmosphere in the usual way so that upon a subsequent normal brake application delivery pressure from the brake valve can readily move valve 32 off its seat 29 to apply the brakes through the supply port and passage 30, 31 in the usual manner.

Pressure admitted to the control cavity 44 upon energization of the solenoid 70 as above described also flows by way of passage 74 to the cavity 76 above the diaphragm 78. Upon this occurrence the entire diaphragm is pushed downwardly until the ball valve 105 closes the choke 108 to disconnect delivery pressure from chamber 22 by way of choke 108 and port 96. With the valve 105 seated, further downward movement of the disc 90 and hence the central portion 83 of the diaphragm is arrested. However, as previously explained, intermediate portion 84 of the diaphragm, due the annular lines of reduced thickness 82, is capable of a degree of downward movement independently of the central portion and as the intermediate portion thus continues to move downwardly it pushes the piston 93 downwardly with respect to the disc 90 to move the upper surface of the piston away from the lip 92 thus communicating the pressure chamber 22 of the actuator with atmosphere by way of port 96, the ports 94 through the piston 93, the port 99 through the upper end of piston 97, passage 101, and past restrictor 103 to exhaust port 102. Because the regular inlet port 30 is closed by valve 32 and the bleed port 108 is closed by valve 105, when the pressure chamber is connected to atmosphere as just described, no further fluid can flow from the brake valve into the actuator chamber 22. Furthermore, because the upper side of the diaphragm 78 is exposed to whatever pressure is delivered thereto from the brake control valve, the intermediate portion 84 of the diaphragm continues to move the piston 93 downwardly until its flange 97 engages the abutment afforded by the upper edge of the annular wall defining the recess 95. The parts are retained in the described positions with the exhaust route up to the restrictor 103 fully open so long as brake valve pressure exists in the cavity 76.

When the wheel has recovered by accelerating to a predetermined level, say G2, the solenoid 70 is de-energized whereupon the valve 58 is returned to the position of the drawing thus disconnecting the control cavity 44 from brake valve pressure while connecting it to atmosphere through the interior of pipe 52 and vent port 54, thus exhausting the cavity 76 on the upper side of the diaphragm 78 whereupon the spring 107 moves the piston 93 upwardly until its upper surface engages the lip 92 thus disconnecting the actuator chamber 22 from the exhaust port 102. Further upward movement of the piston 93 against the lip raises the disc 90 and with it the stem 104 to unseat valve 105 and communicate the interior of the chamber 22 with brake valve pressure via passage 110 and choke 108. Thus at the G2 level not only is pressure reduction in chamber 22 terminated, but the pressure commences to be restored at a controlled rate through the choke 108 and port 96. Meanwhile, because brake control valve pressure still exists behind the check valve 42 to retain this closed, even though pressure is now exhausted from the control cavity 44 it nevertheless continues to exist in the cavity 38 between the check valves 42, 48 to retain the inlet valve 32 closed so that supply to the pressure chamber during an adaptive mode of brake control is provided solely through the choke port 108 whenever the valve 105 controlling the choke is open.

As fluid pressure is restored in the actuator chamber 22 the wheel again decelerates and when it reaches the predetermined level of deceleration indicative of near wheel skid, the solenoid is again energized and the cycle repeated.

As previously mentioned, the rate of exhaust from the actuator cavity is controlled by the restrictor 103 generally inversely to the pressure existing in the brake actuator at the time pressure reduction in the chamber 22 begins in response to the energization of solenoid 70 and proportioning of the mass rate of fluid flow is determined by the position of the variable restrictor 103 in the path of fluid from the chamber 22. As can be seen the restrictor comprises a piston 112 slidable in a cylindrical bore 114 intersecting the exhaust passage 101 inwardly of the exhaust bore 102. The piston is provided with seals 116 above and below the passage 101 and is provided with a series of steps 118 between the seals 116. In the position of the piston 112 in the drawings it can be seen that the smallest diameter portion of the piston is in the path of fluid flow to the exhaust port thus offering minimum restriction to the exhaust. When the piston is raised, a larger diameter portion thereof is presented in the path of fluid flow, thus increasing the restriction to the exhaust fluid. The piston is positioned relative to the exhaust passage 101 by pressure applied to its lower end which extends into a pressure cavity 120 connected to the interior of the actuator chamber 22 by a passage 122. As can be seen, the lower end of the piston is provided with a stepped flange 124 with the outer step being engaged by the lower end of a spring 126 whose upper end engages the upper wall of the cavity 120. The second step of the flange 124 carries a spring 128 whose upper end is spaced below the upper wall of the cavity 120 so as to engage it only after the piston has been raised an initial distance in response to actuator pressure in the cavity 120 acting on the lower face of the piston whose upper face, it will be noted, is exposed at all times to atmosphere by a vented passage 129. The lower end of the pressure cavity 120 is closed by a sealed disc 130 held in place by a clip 132.

The rates of springs 126, 128 are related to the exhaust areas defined by the stepped portions of the piston 112. (In lieu of the pairs of springs, a single variable rate spring could be utilized.) Thus for a very low brake pressure, the upward movement of the piston is controlled by the outer spring 126 so that when the exhaust lip 92 is opened, only slight restriction is offered to the flow of exhaust fluid from the chamber 22 to the exhaust port 102. If intermediate pressure exists in the actuator chamber as skidding impends, then the piston is raised a greater extent, thus reducing the exhaust area afforded by the stepped portion of the piston. When the pressure in the actuator is at yet a higher level when skidding impends, both springs 126, 128 now resist the further upward movement of the piston. Preferably, and in accordance with the invention, the resistance to piston movement offered by the springs is selected such that for any given pressure level in the chamber 22 at the time exhaust commences the resistance to exhaust flow offered by the restrictor produces a mass flow rate which is substantially constant regardless of the pressure in the chamber 22. Though it is within the purview of the invention to have different flow rates governed by the pressure in the actuator chamber 22, extensive tests have established that optimally a restrictor configuration and spring rate which provides a substantially constant mass flow rate for every pressure level in the chamber 22 accomplishes with the greatest efficiency the basic purpose of the invention which is to preserve maximum pressure in the chamber, regardless of the pressure level at which skidding impends, for continued braking after just enough pressure has been reduced to permit a wheel to recover away from a near skidding condition. Tests have established that where a plot of exhaust area against brake chamber pressure produces a relatively smooth substantially hyperbolic curve, this defines the essential parameters for determining restrictor size and spring rate. For example, with the stepped piston shown, a modified hyperbolic plot is achieved by the use of two springs, one of which comes into play only during periods of higher pressure.

Referring now to FIG. 5, the numeral 184 refers to a tare check valve for controlling the exhaust port downstream of the restrictor 112. The purpose of the check valve is to ensure that sufficient pressure is trapped in the brake chamber to prevent the brake shoes from leaving the drum whenever the brakes are being controlled in the adaptive mode. If this pressure is not maintained, and it may vary from 1 to 15 psi for different types of brakes, there is a loss of efficiency in the time required for the pressure to build up in the actuator chamber through the choke 108 to flex the brake diaphragm and move the shoes back against the drums.

As can be seen in FIG. 5, the check valve 184 is of usual construction and is urged by a spring 186 in opposition to fluid flow through the port 102 against a seat 188 surrounding the port 102. The valve 184 and spring 186 operate in a cavity 189 containing a combined valve guide and spring seat 190 having an O-ring 192 adjacent its outer end and is retained in the cavity 188 by a retaining ring 194. The interior of the cavity communicates with atmosphere through ports 196 and radial openings 198 in the guide with the outer side of the cavity being sealed against external dirt and moisture by the peripheral edge of a diaphragm 200 centrally connected to the combined spring seat and valve guide 190 by a screw 202. The rate of the spring 186 is selected such that when residual actuator pressure under adaptive control falls to a level just short of the level at which the shoes are retracted from the drum, the spring closes the check valve to trap this residual pressure in the actuator chamber so that the shoes remain in engagement with the drum even though at this point they may be performing no actual braking function.

The means for controlling the energization of the solenoid is illustrated in FIG. 4 and comprises a wheel speed counter 134 connected to a differentiator 136 whose output is a voltage representative of wheel deceleration and acceleration.

In the regular adaptive mode wherein a skid impends on a reasonably good road, when the wheel decelerates to the level G1 shown in FIG. 2 the differentiator produces a signal level in excess of a first G1 reference level of a comparator 138. A signal is generated at the output of the comparator and sent to one input of an AND Gate 140 whose other input is normally positive as will be demonstrated. The output of the AND Gate 140 is fed to one input of an OR Gate 142 which produces an output signal leading to one input of a second AND Gate 144 whose other output is normally positive as will be demonstrated. The output signal from AND Gate 144 operates a valve driver stage 146 to energize the modulator solenoid 70 and connect the interior of the brake actuator chamber 22 to exhaust.

The comparator 138 is of the type which has a first reference wherein a signal is produced at its output at the G1 level of acceleration. Thereafter, the reference is changed in response to the G1 signal so that the output signal is turned off when the wheel accelerates to the level G2 whereupon the solenoid is de-energized and pressure restoration recommenced.

Safety features, including an override control for under braked conditions, for example, an extremely slippery road, are provided. For example, in the event that a G1 signal is not produced within a predetermined time, say one second, following the preceding G1 signal, a cycle rate timer 148 produces a positive signal which is inverted by an inverter 150 to a zero signal at the upper input of AND Gate 140 thus preventing the production of a positive signal at the output of the AND Gate in response to a G1 signal. So long as cycle rate timer 148 receives a signal within its set period by way of a one shot 152 connected to the output of AND Gate 140 and to the input of the timer through an OR Gate 154, the output of the timer remains zero so that the upper input of AND Gate 140 thus remains conditioned to produce a positive signal at its output to control the valve driver stage in response to a G1 output signal from the comparator 138.

The cycle rate timer 148 is disabled by the presence of a continuous positive signal at its input. Thus when a brake switch 156 is closed its positive signal is inverted to zero by an inverter 158. This has no effect on the timer. However, when the brakes are released the zero signal at the output of the switch 156 is inverted by inverter 158 to a positive signal which is fed through an OR Gate 160 to the set input of a flip flop 162 producing a positive output signal which is fed through OR Gate 154 to the cycle rate timer to disable it. As can be seen, the reset input of flip flop 162 is connected to the output of the G1/G2 comparator 138 so that the positive output of the flip flop is switched off by the first G1 signal, thus enabling the timer 148 to perform its timing function when the brake pedal is depressed to apply the brakes and the wheel thereafter accelerates to the G1 level.

Referring back to the brake switch 156, it will be noted that when the switch is opened thereby producing a positive signal at the output of inverter 158, this signal is inverted to a zero by an inverter 164 at the input of AND Gate 144 so that no signal can appear at the output of this gate and the valve driver stage is thus retained de-energized when the brake switch is open. Obviously, when the switch is closed by the foot pressure on the brake pedal, the zero signal thus produced at the output of inverter 158 is converted to a positive signal at the lower input of AND Gate 144 so that it is in readiness to produce an output signal whenever a signal appears at its upper input in response to a signal at the output of the G1/G2 comparator 138.

A second safety feature is an exhaust timer 166 whose input is connected to the output of the driver stage 146. Thus when the actuator chamber 22 is opened to exhaust in response to energization of the solenoid 70, if the energizing signal is not extinguished within the set period of the exhaust timer, say four seconds, a positive signal is produced at its output. As can be seen, this signal is fed through OR Gate 160 to the set input of the flip flop 162 thus disabling the cycle rate timer. At the same time, the exhaust timer signal is inverted by inverter 164 to a zero signal at the lower input of AND Gate 144 to positively shut down the driver stage 146 and de-energize the solenoid. The exhaust timer may include a memory which prevents the re-enabling of the system for adaptive operation until the cause of the derangement has been determined.

As previously mentioned, in addition to the foregoing regular adaptive mode of brake control, the system of the invention provides for adaptable override control under extremely bad, that is to say, slippery road conditions as are represented by the plots 18, 19 in FIGS. 1 and 2 respectively. The override system operates substantially as described in detail in the copending application of Davis et al mentioned hereinbefore and becomes functional when a linear wheel speed just short of lockup, say 5 mph, is sensed by a wheel speed comparator 168 which is connected directly to the output of the wheel speed counter 134, at the same time that a wheel deceleration level $G_o$ (see FIGS. 1 and 2) is sensed by a $G_o$ comparator 170. The output signals of these comparators 168 and 170 are fed to the two inputs of an AND Gate 172 whose output becomes positive when both inputs are positive. This signal is pulsed through a one shot 174 and fed to the set input of a flip flop 176 which thus produces a positive signal at its output. This signal effects energization of the driver stage 146 through OR Gate 142 and AND Gate 144 entirely independently of the G1/G2 comparator 138. In the override mode, instead of de-energizing the solenoid to close the exhaust and restore pressure in the actuator at a G2 level of acceleration, the exhaust cycle is retained beyond the G2 level and until the wheel has reached maximum acceleration, that is to say, the point G max. in FIG. 2. Thus it can be seen, by maintaining the exhaust open for the elapsed time between the points $G_0$ and G max. there is a longer period of exhaust than would be possible were the system to respond merely to G1 and G2 signals of the regular adaptive mode. When a pending skid exists with very low actuator pressure, a road will have a degree of slipperiness on the order of wet ice and were the exhaust valve under these conditions to be closed to the G2 level, insufficient pressure would be exhausted from the actuator to allow the wheel to recover from its skidding condition in time before restoration of pressure would cause it to continue skidding. Thus an override system for extreme conditions is highly desirable.

As can be seen in FIG. 4, a peak detector 178 connected to a differentiator 136 senses maximum wheel acceleration and puts out a signal which is pulsed by a one shot 180 and transmitted to an OR Gate 182 which produces an output signal leading to the reset input of flip flop 176 to de-energize the valve driver stage 146 and effect pressure restoration in the actuator. At the same time the disabling signal to the cycle rate timer is extinguished so that the timer is in readiness for normal operation in the event road conditions improve so that the system is responsive to the regular G1/G2 signals.

In the event that the wheel after decelerating to the $G_0$ level and slowing to five miles per hour, thereafter continues to decelerate to the G1 level so that a turn off G2 reference is produced in comparator 138, when the wheel reaches the G2 level, as it will enroute to G max. (see FIG. 2), the turn-off signal produced at the G2 level has no effect other than to produce a zero signal at the upper input of OR Gate 142. However, the lower input of this gate receives its signal from override flip flop 176 so that the operation of this controls the energization and de-energization of the drive stage entirely independently of G1/G2 comparator 138.

It will be seen that the other input of OR Gate 182, whose output is connected to the reset input of override flip flop 176, is connected to the output of OR Gate 160 so that when the brake switch is open or the exhaust timer 166 operated, the positive signal produced thereby resets flip flop 176 at the same time as the AND Gate 144 is rendered inoperative to block signals to the valve driver stage.

It is believed that the operation of the modulator, the restrictor responsive to brake chamber pressure, and the control system has been adequately described herein and further description thereof is unnecessary.

What is claimed is:

1. In an adaptive braking system for fluid pressure operated brakes, means for reducing the pressure in a fluid pressure brake actuator in response to an impending skid comprising an exhaust port connected to the actuator, an exhaust valve for controlling the flow of fluid from said actuator through said exhaust port, means responsive to an impending skid for opening said exhaust valve, means for controlling the rate of fluid flow from said actuator upon opening of said exhaust valve, and means responsive to the fluid pressure in the actuator and operatively connected to said flow rate controlling means for establishing a flow rate in accordance with the pressure in the actuator, said flow rate controlling means including means for varying the effective exhaust area in the path of fluid flow from said actuator through said port upon opening of said exhaust valve, aid last-named means being operatively connected to said means responsive to the pressure in the actuator whereby the exhaust area is established in accordance with the pressure in the actuator.

2. The adaptive braking system of claim 1 wherein the means responsive to the pressure in the actuator and the exhaust area varying means are operatively connected so as to provide a small effective exhaust area in response to high pressure in the actuator and provide a large effective exhaust area in response to a low pressure in the actuator.

3. In the adaptive braking system of claim 1 wherein the means responsive to the pressure in the actuator and the exhaust area varying means are operatively connected to provide a substantially constant mass rate of flow from said actuator for any pressure existing in the actuator at the time said exhaust valve is open.

4. In the adaptive system of claim 1 including means responsive to acceleration of said wheel following the opening of said exhaust valve for closing said exhaust valve and restoring fluid pressure in said actuator.

5. The system of claim 1 including delivery port means for connecting said actuator with a source of fluid pressure, delivery valve means for controlling the flow of fluid pressure from said source to said actuator through said delivery port means, and means responsive to deceleration of said wheel to an impending skid for closing said delivery valve means to cut off all delivery of fluid pressure to said actuator at the same time as said exhaust valve is opened in response to deceleration of the wheel to an impending skid.

6. The system of claim 5 wherein said delivery port means includes a main delivery port and a choke port, said delivery valve means including a main delivery valve controlling said main port and a second valve for controlling said choke port, the means responsive to deceleration of said wheel to an impending skid for opening said exhaust valve including other means responsive to said impending skid for closing said main and choke valve at the same time as said exhaust valve is opened, means for retaining said main valve closed until the source of fluid pressure is disconnected from said actuator, and means responsive to the acceleration of said wheel following the opening of said exhaust valve for closing said exhaust valve and opening the valve controlling said choke port whereby said fluid pressure is restored to said actuator at a controlled rate solely through said choke port.

7. In the adaptive system of claim 1 wherein the means for varying the effective exhaust area comprises a cylinder intersecting the path of fluid flow from said actuator through said exhaust port, a variable area piston reciprocal in said cylinder and constructed and arranged that in one extreme position it offers maximum restriction to flow through said cylinder to said exhaust port and in a second extreme position it offers minimum restriction to flow through said cylinder, the restriction offered by said piston varying in accordance with its position between said extremes, a pressure responsive member exposed at all times to pressure in said actuator and operatively connected to said piston, and resilient means acting on said piston to urge it towards the extreme position wherein it offers minimum resistance to fluid flow through said cylinder, said resilient means resisting movement of said piston towards its other extreme position in response to increased pressure in said actuator whereby said piston is positioned in the cylinder relative to its extreme position in accordance with the pressure in said actuator.

8. In the adaptive system of claim 7 wherein the variable area portion of said piston is so constructed and arranged that the mass flow rate from said actuator is substantially constant for any position taken by said piston in response to the pressure in said actuator.

9. The modulator valve of claim 8 wherein a variable area restrictor is provided in the path of fluid flow from said actuator upon opening of said exhaust valve, and means responsive to fluid pressure in the actuator for positioning the restrictor in the path of fluid flow such that for a high pressure in the actuator a large restriction is offered to fluid flow from the actuator and for a low pressure in the actuator a small restriction is offered to fluid flow from the actuator.

10. In the adaptive system of claim 1 including a tare check valve for controlling said exhaust port, said tare check valve including a valve element arranged to close said exhaust port in opposition to fluid flow therethrough, a spring operating on said valve to urge it towards its closed position, the rate of said spring being selected to close said valve and trap residual pressure in said actuator at a level just sufficient to prevent retraction of the brake shoes from the drum following the opening of said exhaust valve in response to an impending skid.

11. In an adaptive braking system for a wheeled vehicle having fluid pressure operated brakes:
    means for controlling braking pressure in response to an impending skidding condition, said means including a housing defining a chamber therewithin having an inlet port communicating said chamber with a fluid pressure source when a brake application is effected, an exhaust port communicating with said chamber, valve means normally preventing communication between said chamber and said exhaust port, but opening to permit communication therebetween in response to said impending skidding condition of a vehicle wheel, and means responsive to the fluid pressure level in said chamber to vary the effective area of said exhaust port for establishing a flow rate through said exhaust port in accordance with the fluid pressure level in said chamber.

12. The invention of claim 11:
    said means responsive to the fluid pressure level in said chamber being constructed and arranged to establish a substantially constant mass rate of fluid flow from said chamber for any pressure existing in the latter at the time said valve means is actuated.

13. The invention of claim 11:
    said means responsive to the fluid pressure level in said chamber providing a relatively small effective area of said exhaust port in response to high pressure in said chamber and a larger effective area of said exhaust port in response to low pressure in said chamber.

14. For use in an adaptive brake system, modulating valve means for controlling the reduction and restoration of fluid pressure in said actuator in response to skidding conditions of a wheel comprising a delivery port for connecting a source of fluid pressure to said actuator, a valve for controlling said delivery port, a choke delivery port in said actuator, a normally open valve for controlling said choke delivery port, an exhaust port in said actuator, a normally closed exhaust valve for controlling said exhaust port, a diaphragm operatively connected to said exhaust valve and to said choke port valve, a second diaphragm connected to said delivery valve, a control chamber having an inlet port and a vent port, a double acting valve element normally closing said inlet port and opening said vent port, said control chamber being connected to pressure spaces above the diaphragm for said delivery valve and the diaphragm connected to said choke port valve and said exhaust valve, a solenoid connected to said double acting valve element and adapted to be energized in response to a wheel deceleration to the level of an impending skid whereby said valve is moved to a position disconnecting said vent port from said control chamber while connecting the latter to delivery pressure from said source through said inlet port, the fluid pressure in said control chamber operating on the diaphragm over said delivery valve to close the same, and operating on the second diaphragm to close said choke port valve and thereafter by continued movement of said diaphragm to open said exhaust valve to reduce pressure in said actuator and permit said wheel to accelerate, check valve means for preventing the escape of fluid pressure from the diaphragm closing said delivery valve until release of delivery pressure, said solenoid being de-energized in response to acceleration of said wheel to move said valve element to its first position closing said inlet port and opening said vent port to relieve pressure from said first diaphragm and enable said choke port valve to open and said exhaust valve to close whereupon pressure is restored to said actuator solely through said choke port.

* * * * *